(12) United States Patent
Jung et al.

(10) Patent No.: US 7,008,663 B2
(45) Date of Patent: Mar. 7, 2006

(54) FEEDSTUFF COMPOSITION FOR REPLACING ANTIBIOTICS

(75) Inventors: Yeon Kweon Jung, Sungnam-si (KR); In Ho Kim, Chunan-si (KR)

(73) Assignee: Seobong Bio Bestech Co., Ltd., Seoul (KR)

( * ) Notice: Subject to any disclaimer, the term of this patent is extended or adjusted under 35 U.S.C. 154(b) by 302 days.

(21) Appl. No.: 10/343,280

(22) PCT Filed: Jul. 10, 2001

(86) PCT No.: PCT/KR01/01183

§ 371 (c)(1),
(2), (4) Date: Jan. 28, 2003

(87) PCT Pub. No.: WO02/09533

PCT Pub. Date: Feb. 7, 2002

(65) Prior Publication Data

US 2003/0175405 A1 Sep. 18, 2003

(30) Foreign Application Priority Data

Jul. 31, 2000 (KR) .............................. 2000-44439
Feb. 12, 2001 (KR) .............................. 2001-6784

(51) Int. Cl.
*A23K 1/175* (2006.01)

(52) U.S. Cl. ...................... 426/623; 426/630; 426/635; 426/805; 426/807

(58) Field of Classification Search ................ 426/623, 426/630, 635, 805, 807
See application file for complete search history.

(56) References Cited

U.S. PATENT DOCUMENTS 3,868,467 A * 2/1975 Olson ........................ 426/72
5,824,707 A * 10/1998 Saxton ...................... 514/499
6,214,391 B1 * 4/2001 Ju et al. ...................... 426/74

FOREIGN PATENT DOCUMENTS

| EP | 0484446 | * | 5/1992 |
| HU | 37165 | * | 8/1986 |
| JP | 55-127958 | | 10/1980 |
| JP | 60220141 | * | 11/1985 |
| JP | 6128495 | * | 2/1986 |
| JP | 62155935 | * | 7/1987 |
| JP | 09-065837 | | 3/1997 |
| KR | 1998-65422 | | 10/1998 |
| KR | 2000-0036931 | | 7/2000 |
| WO | WO 91/03167 | | 3/1991 |

OTHER PUBLICATIONS

"Glossary of Geology", ed. Gary et al. pub. American Geological Institute 1974, pp. 31, 75, 255, 286, 471, 747, 803.*

* cited by examiner

*Primary Examiner*—C. Sayala
(74) *Attorney, Agent, or Firm*—Darby & Darby

(57) ABSTRACT

The present invention an antibiotic-free fodder composition for domestic animals. According to the present invention, by adding germanium biotite instead of antibiotic to assorted fodder commonly used in the livestock industry, it is possible to produce domestic animals having a growth rate and immune ability as good as by adding a large amount of antibiotic to the feed. Therefore, in preparing feed, use of antibiotic harmful to animals and a human which has consumed the meat of the animals can be avoided partially or totally, thereby enabling production of "healthful meat". The present composition comprises a basal diet including corn, soybean meal, molasses, salt, vitamin premix and mineral premix, and 0.1 to 3.0% of germanium biotite including 36 ppm of germanium, and biotite, muscovite, feldspar, tourmaline, zircon, garnet, apatite and opaque minerals, and having 0.93% of emissivity and $4.31 \times 10^2$ $W/m^2 \mu m$ of radioactive energy at a range of far infrared rays between 5 and 20 $\mu m$.

8 Claims, 1 Drawing Sheet

FEEDSTUFF COMPOSITION FOR REPLACING ANTIBIOTICS

This is a U.S. national phase application under 35 U.S.C. §371 of International Patent Application No. PCT/KR01/01183, filed Jul. 10, 2001, and claims benefit of Korean Patent Application No. 2000-44439, filed Jul. 31, 2000, and clainis benefit of Korean Patent Application No. 2001-6784, filed Feb. 12, 2001. The International Application was published in English on Feb. 7, 2002 as WO 02/09533 A1 under PCT Article 21(2).

TECHNICAL FIELD

The present invention relates to an antibiotic-free fodder composition for domestic animals, and more particularly to an antibiotic-free fodder composition for domestic animals capable producing "healthful meat" which is good for preventing various adult diseases.

BACKGROUND ART

Due to the trend towards westernization resulting from economic development, people increasingly consume livestock products. However, people have negative opinions of livestock foodstuffs because of the content of animal fat. The intake of animal fat is known to be one of the main causes of arteriosclerosis, which is a disease of the circulatory system. Particularly, cholesterol is known as a main cause of arteriosclerosis.

As people's interest in their health increases, there have been developed and made commercially available various health foods for the purpose of preventing adult diseases such as obesity, arteriosclerosis, etc. and promoting healthy lifestyles. To keep pace with this trend, the livestock industry produces "healthful meat" by incorporating various herbal remedies, antibiotics and the like into feedstuff for domestic animals.

However, the antibiotics added to the feedstuff for domestic animals cannot be completely digested nor eliminated from their bodies for at least 2 to 3 months after intake. Therefore, if the domestic animals are slaughtered and consumed prior to the clearance period of drug, the residual antibiotics in the animals can attenuate the immune responses of a body which has consumed the meat of the animals. Also, plasmids which are genetic materials responsible for mediating resistance to antibiotics in microbes can be transferred to another microbes through conjugation. In this manner, as the number of microbes having a resistance to antibiotics increases, the risk that such microbes will infect human bodies increases proportionately.

For this reason, recently, there has been raised concerns regarding the antibiotic resistant bacteria, as well as residual antibiotics in the bodies of the animals, and thus much research and studies are being conducted. Particularly, studies seeking for an endogenous substance in the body of animals which can activate the immune ability of the body, in place of antibiotics, are actively in progress.

In Korea, since a long time ago, silicate clay minerals such as kaolinite, zeolite, bentonite, vermiculite, etc. have been used in the agricultural and fisheries industry and for cleanup of the environment due to their characteristic properties. In the field of the livestock industry, such minerals are sometimes used to promote growth of animals, to improve digestion and feed efficiency, to control water content of excrement and to reduce its odor. Especially, it has been reported that the addition of zeolite to fodder has a favorable effect on characteristics of muscles and fats of pig and chicken (for example, see Pond et al. (1988); Hagedorn et al. (1990); and Kovar et al. (1990)).

Particularly, upon reviewing the results of research and studies which have been conducted so far regarding the addition of minerals to livestock fodder, for example, Son and Park (1997) reported that when growing chickens are fed with fodder containing 0.3% of elvan stone, water contents in excrements are reduced and nutrients contained in the fodder are effectively utilized. Kwon (1999) reported that when growing pigs are fed with fodder containing far infrared radioactive materials, weight gains of the animals are increased. Further, Yang (1999) reported that when growing and finishing pigs are fed with scoria, which is reddish brown colored and hardened lava that has retained the vesicles produced by escaping gases, a higher percentage of the pigs get a grade A rating of pigs.

For reference, biotite gneiss is porous in configuration with black speckles on a gray ground. Its specific ingredients include various oxides including silicon dioxide ($SiO_2$), aluminum dioxide ($Al_2O_3$), iron oxide ($Fe_2O_3$), calcium oxide (CaO), magnesium oxide (MgO), Titanium oxide ($TiO_2$), phosphorus pentoxide ($P_2O_5$), potassium oxide ($K_2O$), sodium oxide ($Na_2O$), manganese trioxide ($MnO_3$) and it further has a high far infrared ray emissivity of 93%. Also, this mineral can absorb odors and moisture, and purify water through ion exchange. In particular, it can absorb and remove harmful heavy metals, such as those which are injurious to bodies, including cadmium, mercury, lead, etc, by ion control action, thereby providing antidotal effects.

Germanium is a silvery-gray metall able to radiate far infrared rays. This metall is known to enhance the immune system and inhibit tumor cell growth by stimulating production of interferon. Also, it is known to have a deodorizing capability versus gases injurious to human or animals. Therefore, it is expected that germanium can be used in elements for building construction and as an absorbent of ammonia gas in a pigsty.

Thus, the present invention is made on the basis of the above described matters and the object of the present invention is to provide an antibiotic-free fodder composition for domestic animals comprising a basal diet commonly used in the livestock industry and a predetermined amount of germanium biotite ground into powder. The fodder composition can produce "healthful meat" without containing antibiotics, which is good for preventing various adult diseases.

DISCLOSURE OF INVENTION

In order to accomplish the above object, according to one aspect of the present invention, a fodder composition is characterized by comprising a basal diet including corn, soybean meal, molasses, salt, vitamin premix and mineral premix, and 0.1 to 3.0 wt % of germanium biotite including 36 ppm of germanium, and biotite, muscovite, feldspar, tourmaline, zircon, garnet, apatite and opaque minerals, and having 0.93% of emissivity and $4.31 \times 10^2$ W/m² $\mu$m of radioactive energy at range of far infrared rays between 5 and 20 $\mu$m.

According to another aspect of the present invention, the fodder composition is characterized in that the germanium biotite is pulverized to have a particle size of 100 to 350 mesh.

Feeding the composition according to the present invention to domestic animals allows the domestic animals to receive germanium biotite in place of antibiotic, thereby providing "clean meat" and promoting healthy lifestyles of people.

BRIEF DESCRIPTION OF DRAWINGS

The above objects and other objects, features and advantages of the present invention will become more apparent from the following detailed description when taken in conjunction with the accompanying drawing, in which.

BEST MODES FOR CARRYING OUT THE INVENTION

Now, the present invention is described in detail.

According to the present invention, the fodder comprises the germanium biotite containing 36 ppm of germanium in a certain ratio, depending on the growing state of animals, instead of the antibiotic. Therefore, it is possible to exclude a part or all of an added amount of the antibiotic.

The germanium biotite used in the present invention includes germanium, biotite, muscovite, quartz, feldspar, tourmaline, zircon, garnet, apatite, opaque minerals and the like. This mineral enhances the immune ability and inhibits tumor cell growth by stimulating production of interferon by emitting far infrared ray. Also, it has antibiotic and antifungal properties and functions to absorb and decompose harmful gases, thereby enabling protection of animals from toxic substances, viruses, etc.

Figure 1A:
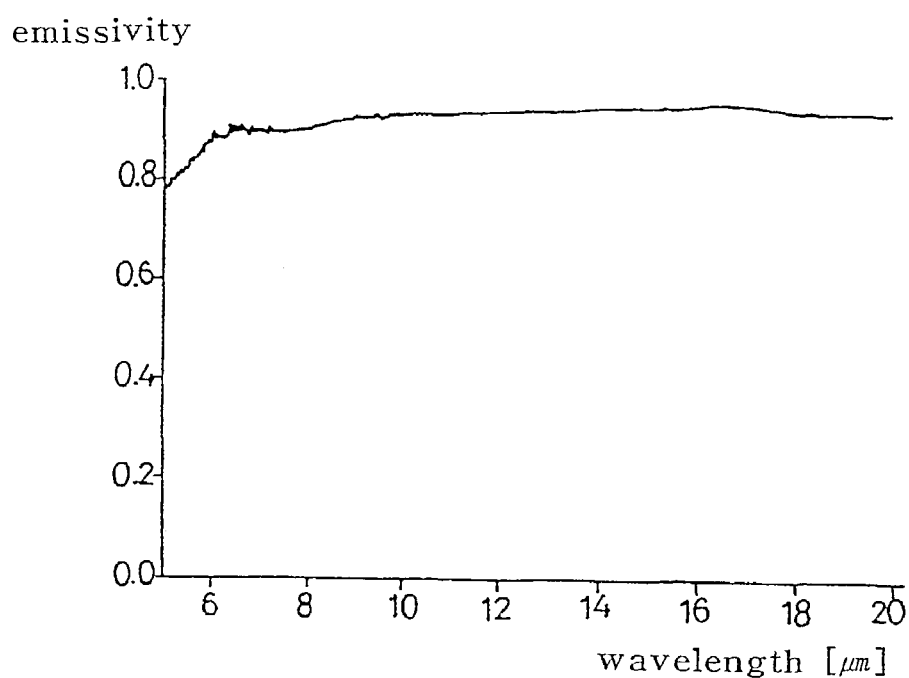
FIGS. 1A and 1B are graphs showing far infrared ray emmisivity and radioactive energy of the germanium biotite according t the present invention.
Figure 1B:
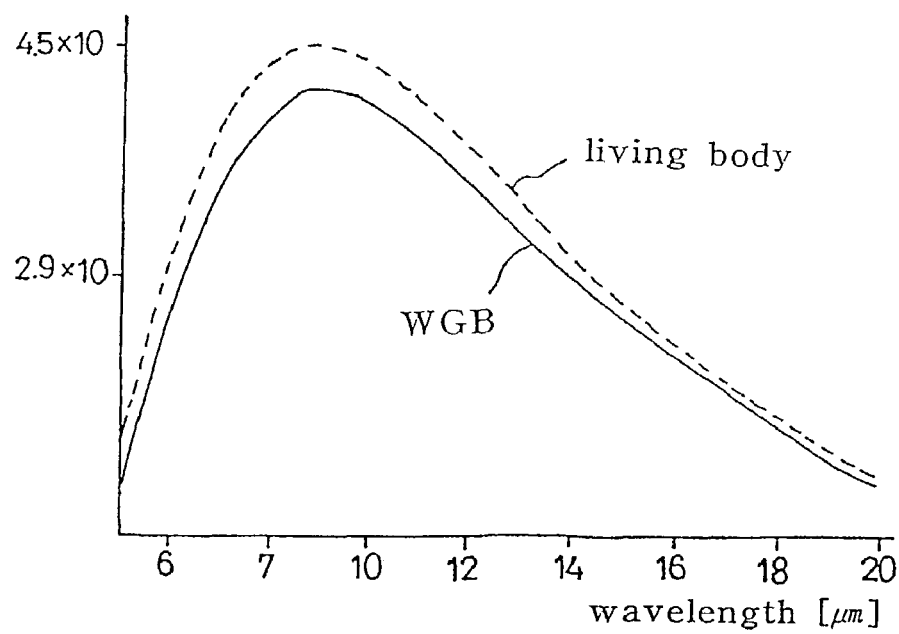

FIG. 1 is a graph showing far infrared ray emissivity and radioactive energy of the germanium biotite according to the present invention, as measured at a temperature of 50° C. In the graph, the germanium biotite (solid line) shows 0.93% of emissivity and $4.31 \times 10^2$ W/m² μm of radioactive energy at a range of far infrared rays between 5 and 20 μm. Comparing to (b), the radioactive energy (solid line) of the germanium biotite has a distribution very similar to that of a living body. Therefore, it is noted that the far infrared wavelength emitted from the germanium biotite is suitable for the animals such as cows, pigs, chickens, etc. and is easily absorbed by such animals.

According to the present invention, the germanium biotite added to the fodder for domestic animals preferably is of powder form with a particle size between 100 to 350 mesh, particularly about 200 mesh. When the particle size is less than 100 mesh, the large germanium biotite particle cannot be digested. Consequently, the absorption of minerals is poor and the feed efficiency is reduced. When the particle size is over 350 mesh, cost required to grind the germanium biotite into fine particulate is increased. Also, the molecular structure and material properties of the germanium biotite per se changes, resulting in loss of minerals. Consequently, the virtues of the germanium biotite according to the present invention are lost.

In place of the germanium biotite, elvan stone may be used. However, its efficacy is not equal to the germanium biotite containing 36 ppm of germanium. As described above, the germanium biotite according to the present invention can emit plentiful far infrared rays which are of benefit to the domestic animals, and also has antibiotic and antifungal effects and functions to absorb and decompose harmful gases, thereby enabling protection of animals from toxic substances, viruses, etc. Also, the germanium contained in the germanium biotite can neutralize the harmful gases and release anion. Therefore, health of the animals administered with the germanium biotite can be retained and enhanced without using antibiotics.

The domestic animals collectively bred are susceptible to various diseases. For protection of the animals from such diseases, vaccines are generally administered. However, the vaccines may inhibit the growth of the animals, thereby leading to economic losses by livestock raisers.

On the other hand, when the animals are fed with the fodder containing the germanium biotite according to the present invention, since the immune systems of the animals are enhanced, eventually, the frequency of illness is reduced and the productivity of the domestic animals is improved. In other words, the germanium biotite can maintain the balance of microorganisms in the internal organs due to its natural antibiotic property and absorb heavy metals and remove toxic substances. Therefore, it is possible to prevent the animals from developing diseases even when artificial antibiotic or antiphlogistic is regulated into a small amount. Further, accumulation of such harmful substances as antibiotics and the like in persons who have consumed the meat of the animals is prevented. Thus, it is possible to increase the productivity of meat of good quality.

EXAMPLE 1

This example was carried to demonstrate the effect of the germanium biotite added to the fodder composition according to the present invention on growing pigs. Firstly, 54 growing pigs (triple hybrids of Duroc×Yorkshire×Landrace breeds) were used for the test. They each had a body weight of 32.47±0.90 kg at the beginning of the test. They were raised in the experimental breeding farm annexed to Dankook University and fed with the basal diet comprising mainly corn-soybean meal as shown in Table 1 below. The pigs were randomly assigned to 6 treatment groups. Each of the groups were administered with no antibiotics (NC), antibiotics (PC), 0.1 wt % (WGB 0.1), 0.3 wt % (WGB 0.3), 0.6 wt % (WGB 0.6) and 0.8 wt % (WGB 0.8) of germanium biotite in addition to the basal diet, respectively. Each test was carried out in triplicate, 3 pigs per assay.

The germanium biotite contains 36 ppm of germanium. Experiments were performed in triplicate.

TABLE 1

| Ingredients | Content (wt. %) |
| --- | --- |
| Corn (CP 48%) | 66.23 |
| Soybean meal | 26.07 |
| Tallow | 3 |
| Limestone | 0.52 |
| Calcium phosphate | 1.16 |
| Molasses | 2.5 |
| Salt | 0.25 |
| Vitamin premix | 0.12 |
| Mineral premix | 0.10 |
| Antioxidant | 0.05 |

Of the common fodder, the corn and wheat flour was provided as a source of energy and the soybean meal was provided as a source of protein. The tallow, which is oil extracted from fat of the domestic animal, was an ingredient for supplementing energy, and calcium phosphate and limestone were supplied as sources of calcium and phosphorus to make up bones. The vitamin and mineral premix included a small amount of vitamin A, vitamin D, vitamin E, riboflavin, niacin, manganese, iron, zinc, calcium, copper, cobalt, selenium, etc.

Further, the basal diet had 3,380 kcal Me/kg, 18.00% CP(crude protein), 0.96% Lysine, 0.70% Ca, 0.60% P, on the basis of NRC(1998) breeding standard. The test fodder was freely fed in a form of powder and water was freely supplied by means of a water supplying station. The body weights and the intake amounts of the fodder for respective animals were checked daily to calculate the weight gain per day, feed intake amount per day and feed efficiency (feed/gain).

Also, the animals were supplied with the fodder to which 0.2% of chromium oxide was added as an indicator from 7 days before the end of the test for measurement of the digestive efficiency. At 4 days after feeding the chromium containing fodder, excrements were collected and dried for analysis. The component elements of the fodder and Cr added as the indicator were analyzed according to AOAC (1994) for chemical and statistic analyses. All of the data were examined for the significant differences between averages by conducting Duncan's multiple range analysis using the General Linear Model Procedure of SAS (1988).

As the results, the weight gain per day, feed intake amount per day and feed efficiency are summarized in Table 2 below. NC (Negative Control) refers to the group having received fodder without antibiotics, PC (Positive Control) refers to the group having received fodder with antibiotics, and WGB (Wangam Germanium Biotite) refers to the treatment group having received fodder with germanium biotite added.

TABLE 2

|  | NC | PC | WGB 0.1 | WGB 0.3 | WGB 0.6 | WGB 0.8 |
|---|---|---|---|---|---|---|
| Weight gain (g/day) | 385 | 451 | 398 | 438 | 431 | 412 |
| Intake amount of Feed (g/day) | 1191 | 1371 | 1213 | 1318 | 1298 | 1264 |
| Feed efficiency | 0.323 | 0.329 | 0.328 | 0.332 | 0.332 | 0.326 |

After raising 54 growing pigs having body weights of 32.47±0.90 kg for 35 days, as compared with the NC group, the body weight was 17% higher in PC group, 14% higher in WGB 0.3 treatment group, 12% higher in WGB 0.6 treatment group. There was no significant difference between the increase in body weight among PC, WGB 0.3 and WGB 0.6 treatment groups. However, the WGB 0.1 and WGB 0.8 treatment groups showed low growth rates of 3% and 7%, respectively.

Also, with regard to the feed intake amount, the PC group showed the highest amount, and the WGB 0.3 and WGB 0.6 groups showed amounts equal to that of the PC group. However, the WGB 0.1 and WGB 0.8 groups showed amounts lower than that of the PC group. With regard to the feed efficiency, there was no significant difference among the test groups.

From the above results, therefore, it can be seen that if the fodder contains 0.3 to 0.6 wt % of wangam germanium biotite, instead of the antibiotics, by the far infrared ray emitted from the WGB the immune systems of the pigs which have ingested the fodder are enhanced. Consequently, the growth rate is improved as much as in the case of adding the antibiotics.

Digestive rates of dry material and nitrogen are shown in Table 3 below.

TABLE 3

|  | NC | PC | WGB 0.1 | WGB 0.3 | WGB 0.6 | WGB 0.8 |
|---|---|---|---|---|---|---|
| Dry material digestive rate | 77.01 | 88.44 | 80.34 | 86.02 | 85.12 | 78.53 |
| Nitrogen digestive rate | 76.20 | 88.03 | 79.32 | 84.87 | 84.63 | 77.95 |

In the above table, the PC, WGB 0.3 and WGB 0.6 treatment groups showed dry material digestive rates higher than those of other groups. Animals fed fodder formulated to have WGB outside of the range of 0.3 to 0.6 wt % showed relatively poor dry material digestive rates, although better than that of the NC group. Thus, it is noted that it would be desirable to add 0.3 to 0.6 wt % of WGB to the basal diet in order to achieve superior digestive rates of dry material, compared to the case of adding the antibiotics.

Also, with regard to the nitrogen digestive rates, the PC, WGB 0.3 and WGB 0.6 groups showed superior rates. The WGB 0.1 and 0.8 treatment groups showed relatively poor nitrogen digestive rates, as compared to the PC group, although better than that of the NC group. Thus, it can be seen that when adding 0.3 wt % to 0.6 wt % of WGB to the basal diet the nitrogen digestive rate is improved as compared to the group having the antibiotics added. Accordingly, it is possible to lower the concentration of ammonia gas in the pigsty and thereby, to produce clean pork.

In view of the above results, it can be seen that 0.3 to 0.6 wt % of WGB in the fodder may substitute for antibiotics.

EXAMPLE 2

In this example, the effect of practical feed formulated to contain the germanium biotite on finishing pigs will be demonstrated.

80 finishing pigs (triple hybrids of Duroc×Yorkshire×Landrace breeds) were used for the test. They had an average body weight of 78.65 kg at the beginning of the test. They were raised in the experimental breeding farm annexed to Dankook University for 50 days and fed with the basal diet comprising mainly corn-soybean meal, according to the nutrition requirements of NRC(1998) standard, as shown in Table 4 below. 20 pigs were randomly assigned to each of 4 treatment groups, which were administered with no additive (Con), 1.0 wt % (WGB 1.0), 3.0 wt % (WGB 3.0) and 5.0 wt % (WGB 5.0) of the germanium biotite in addition to the basal diet, respectively. Each test was carried out in quadruplicate, 5 pigs per assay.

TABLE 4

| Ingredients | Content (wt. %) |
|---|---|
| Corn | 76.74 |
| Soybean meal (CP 47.5%) | 15.82 |
| Tallow | 3.00 |
| Molasses | 2.50 |
| TCP | 0.83 |
| Limestone | 0.61 |
| Salt | 0.20 |
| Vitamin premix | 0.12 |
| Mineral premix | 0.10 |
| Antioxidant | 0.05 |
| Lysine | 0.03 |
| Total | 100.00 |
| Chemical ingredients | |
| ME (cal/g) | 3390 |
| Natural protein (%) | 14 |
| Lysine (%) | 0.70 |
| Calcium (%) | 0.60 |
| Phosphorus (%) | 0.50 |

The basal diet had 3,400 kcal of ME/kg, 14.00% of CP and 0.67% of lysine. The test fodder composition was freely fed in powdered form and water was freely supplied. The body weights and the intake amounts of the fodder for respective animals were measured at the end of the experiment to calculate the weight gain per day, feed intake amount per day and feed efficiency.

Also, the animals were supplied with the fodder to which 0.2% of chromium oxide as an indicator was added from 7 days before the end of the test for measurement of the digestive efficiency. For two days from the third day after feeding the chrome containing fodder, excrements were collected and dried for analysis. The contents of nutrient in the fodder and the excrements were analyzed according to AOAC(1994).

Further, at the beginning of the test and immediately after the end of the test, blood samples were taken from the jugular of pigs. The blood samples were coagulated at 4° C. and then centrifuged at 2,000 rpm for 30 minutes at the same temperature. The respective supernatants were separated and used for analysis.

The concentration of ammonia gas was measured 3 times at 7-day intervals. 5 pigs having similar body weights were used for each test.

In order to examine the effect of WGB on the composition of blood, the total cholesterol concentration was measured using T. chol kit (BOEHRINGER MANNHEIM, Germany) and the high density lipoprotein cholesterol concentration was measured using HDL-C kit (BOEHRINGER MANNHEIM, Germany). The concentration of adult disease preventive factor (Triglyceride) was measured using HITACHI 747, an automatic biochemistry analyzer fabricated by HITACHI, Japan, by determining triglyceride levels using T.G kit (BOEHRINGER MANNHEIM, Germany).

Thickness of back fat was measured using a digital back fat indicator (Renco Lean-meter, USA).

The data from the foregoing measurements were examined for the significant differences between averages by conducting Duncan's multiple range analysis (1955) using the General Linear Model Procedure of SAS(1988).

The weight gain per day, feed intake amount per day and efficiency of feed are summarized in Table 5 below.

TABLE 5

| | Control | WGB 1.0 | WGB 3.0 | WGB 5.0 |
|---|---|---|---|---|
| Initial body weight (kg) | 78.48 | 78.26 | 78.74 | 78.54 |
| Final body weight (kg) | 113.90 | 116.09 | 114.51 | 112.35 |
| Weight gain (g/day) | 708 | 757 | 715 | 676 |
| Feed intake Amount (g/day) | 3108 | 2789 | 2620 | 2631 |
| Feed efficiency | 0.228 | 0.271 | 0.273 | 0.257 |

In the table, the WGB 1.0 showed a significant difference from the control group. The feed intake amount was the highest in the control group at 3,108g/day while the WGB 1.0, WGB 3.0 and WGB 5.0 treatment groups showed 2,789 g/day, 2,620 g/day, and 2,631 g/day, respectively. This is a result similar to the report of Yang (1999) describing that in experiments when growing and finishing pigs are fed with 3% of scoria and zeolite, respectively, significant differences in terms of the weight gain per day were observed. From the above result, it is noted that when the germanium biotite is added at a level of 3 wt %, optimal results can be obtained.

With regard to the feed efficiency, the WGB 1.0 and WGB 3.0 treatment groups showed 0.271 and 0.273, respectively, both of which were improved over the control group at 0.231. This accords with the result from the experiment by Komodo, et al. (1968) in which the addition of 5% of zeolite to feed for finishing pigs improved the feed efficiency by about 6%.

Digestive rates of dry material(DM) and nitrogen(N) are shown in Table 6 below.

TABLE 6

| | Control | WGB 1.0 | WGB 3.0 | WGB 5.0 |
|---|---|---|---|---|
| Digestive rate of DM | 70.99 | 71.26 | 70.53 | 70.37 |
| Digestive rate of N | 64.31 | 67.65 | 67.92 | 65.09 |

In the experiments, the control, WGB 1.0, WGB 3.0 and WGB 5.0 treatment groups showed dry material digestive rates of 70.99, 71.26, 70.53 and 70.37, respectively. There was no significant difference between the rates. This accords the reports by Ballard and Edwards (1988) and Daly (1990) which described that the supplying of zeolite did not influence the coefficient of utilization of nutrient. However, in the above table for the digestive rate of nitrogen, the WGB 1.0 and 3.0 treatment groups were slightly higher than the control group. This is believed to result from 1.0 wt % to 3.0 wt % of WGB incorporated into the feed increasing the utility of nitrogen, and thereby, the concentration of the ammonia gas in the pigsty is considerably reduced.

The respective thickness of back fat are shown in Table 7.

TABLE 7

| | Control | WGB 1.0 | WGB 3.0 | WGB 5.0 |
|---|---|---|---|---|
| Thickness (mm) | 27.19 | 25.71 | 22.81 | 26.38 |

For thickness of back fat, the WGB 1.0 and WGB 3.0 treatment groups showed 25.71 mm and 22.81 mm, respectively. The above values are significantly different from 27.19 mm of the control group. This is a result similar to that of the experiment conducted by Pond et al. (1988) and Kovar et al. (1990) in which feeding of silicate minerals was demonstrated to have a favorable effect on characteristics of muscles and fats of pig and chicken.

Concentration of ammonia gas in the excrements of animals taking in the germanium biotite are shown in Table 8.

TABLE 8

|  | Control | WGB 1.0 | WGB 3.0 | WGB 5.0 |
|---|---|---|---|---|
| Concentration of ammonia gas (mg/kg) | 17.0 | 6.1 | 6.5 | 12.3 |

As seen in the table, the WGB 1.0 and WGB 3.0 showed 6.1 mg/kg and 6.5 mg/kg of concentration of ammonia gas respectively, while the control group showed 17 mg/kg. That is, there is significant difference between the WGB treatment groups and the control group in the concentration of ammonia in the excrements. Therefore, it is noted that the concentration of ammonia in the excrements can be lowered by adding 1.0 to 3.0 wt % of the germanium biotite to the feed of finishing pigs.

Contents of total-cholesterol, triglyceride, HDL-cholesterol and LDL-cholesterol at the beginning (d0) and the end (d50) of the experiments are shown in Table 9 below.

TABLE 9

|  | Item | | | |
|---|---|---|---|---|
|  | Control | WGB 1.0 | WGB 3.0 | WGB 5.0 |
| Total-cholesterol (mg/dl) | | | | |
| 0 day | 97.80 | 110.60 | 113.20 | 105.37 |
| 50 days | 99.33 | 100.00 | 99.00 | 102.27 |
| Difference | 1.53 | −10.60 | −14.20 | −3.10 |
| Triglyceride cholesterol (mg/dl) | | | | |
| 0 day | 48.60 | 47.80 | 42.00 | 48.10 |
| 50 days | 35.25 | 35.50 | 30.00 | 36.60 |
| Difference | −13.35 | −12.30 | −12.00 | −11.50 |
| HDL-cholesterol (mg/dl) | | | | |
| 0 day | 41.60 | 44.50 | 43.25 | 42.50 |
| 50 days | 42.48 | 50.33 | 50.00 | 49.60 |
| Difference | 1.20 | 5.83 | 6.75 | 7.10 |
| LDL-cholesterol (mg/dl) | | | | |
| 0 day | 46.48 | 56.54 | 59.00 | 58.86 |
| 50 days | 49.48 | 42.57 | 43.00 | 40.16 |
| Difference | 3.00 | −13.97 | −16.60 | −18.50 |
| Ig G cholestrol (mg/dl) | | | | |
| 0 day | 515.10 | 531.20 | 547.39 | 538.75 |
| 50 days | 530.47 | 614.81 | 627.14 | 604.24 |
| Difference | 15.37 | 83.61 | 79.75 | 65.49 |

As seen from the table, the total-cholesterol content in the serum was increased in the control group but decreased in the germanium biotite treatment groups. Particularly, the WGB 1.0 and WGB 3.0 treatment groups showed considerably decreased values. The HDL-cholesterol content was observed to be much higher in WGB treatment groups, compared to the control group.

The contents of Triglyceride, an adult disease protective factor, in the sera were observed to be less decreased in the WGB treatment groups, compared to the control group. This indicates that the residual adult disease protective factor is higher in the WGB treatment groups, compared to the control group. The contents of LDL-cholesterol in the sera were observed to be increased in the control group but to be decreased in the WGB treatment groups.

Accordingly, it is noted that when finishing pigs were fed with feed having germanium biotite added according to the present invention, serum concentrations of the total-cholesterol and LDL-cholesterol, major substances contributing to hyperlipidemia, which is a main cause of diseases of the cardiovascular system, can be reduced. This means reduction of such compounds can be achieved in pork obtained from a pig which was fed with the fodder according to the present invention. Thus, it is noted that addition of the germanium biotite in an amount of 1 to 3 wt % to feed produces low-cholesterol pork.

With regard to the contents of immunocyte promoting factor (IgG: Immunoglobulin G) in the sera, the WGB 1.0 WGB 3.0 and WGB 5.0 treatment groups showed increases of 444%, 419% and 326%, respectively, as compared to the control group. Therefore, it is proved that the germanium biotite can enhance the immune ability, thereby being used as a natural antibiotic substance.

In Table 10 below, contents of cholesterol in the meat and the fat around the backbone are shown.

TABLE 10

|  | Item | | | |
|---|---|---|---|---|
|  | Con | WGB 1.0 | WGB 3.0 | WGB 5.0 |
| Meat around the backbone | 495.64 | 471.52 | 438.74 | 431.56 |
| Fat around the backbone | 261.21 | 243.52 | 204.11 | 207.51 |

With regard to the contents of cholesterol in the meat and fat around the backbone, the WGB 1.0, WGB 3.0 and WGB 5.0 treatment groups were lower than the control group. Particularly, the WGB 1.0 and WGB 3.0 treatment groups were shown to have considerably low cholesterol contents. Thus, it is proved that addition of the germanium biotite in an amount of 1 to 3 wt % to feed produces low-cholesterol pork.

From the results of this example, it is noted that when feeding finishing pigs with feed containing the germanium biotite in an amount of 1 to 3 wt % low-cholesterol pork can be obtained and immune ability of the pigs are enhanced by the antibiotic action of the germanium biotite.

EXAMPLE 3

In this example, the effect of the practical feeds formulated to contain germanium biotite on starter pigs will be demonstrated.

60 starter pigs (triple hybrids of Duroc×Yorkshire×Landrace breeds) were used for the test. The pigs had an average body weight of 15.09±0.18 kg at the beginning of the test. They were raised in the experimental breeding farm annexed to Dankook University for 28 days. Experiment protocol included the basal diet comprising mainly corn-soybean meal, as shown in Table 11 below. 12 pigs were randomly assigned to each of 5 treatment groups, which were administered with no germanium biotite (Con), 0.1 wt % (WGB 0.1), 0.3 wt % (WGB 0.3), 0.6 wt % (WGB 0.6) and 1.0 wt % (WGB 1.0) of the germanium biotite in addition to the basal diet, respectively. Each test was carried out in quadruplicate, 3 pigs per assay.

TABLE 11

| Ingredients | Con | WGB 0.1 | WGB 0.3 | WGB 0.6 | WGB 1.0 |
|---|---|---|---|---|---|
| Corn | 64.36 | 64.36 | 64.36 | 64.36 | 64.36 |
| Soybean meal | 28.09 | 28.09 | 28.09 | 28.09 | 28.09 |
| Tallow | 3.00 | 3.00 | 3.00 | 3.00 | 3.00 |
| Limestone | 0.12 | 0.12 | 0.12 | 0.12 | 0.12 |
| Calcicum Phosphate | 1.86 | 1.86 | 1.86 | 1.86 | 1.86 |
| Molasses | 2.00 | 2.00 | 2.00 | 2.00 | 2.00 |
| Salt | 0.20 | 0.20 | 0.20 | 0.20 | 0.20 |
| Vitamin premix | 0.12 | 0.12 | 0.12 | 0.12 | 0.12 |
| Mineral Premix | 0.10 | 0.10 | 0.10 | 0.10 | 0.10 |
| Antiosidant | 0.05 | 0.05 | 0.05 | 0.05 | 0.05 |
| Antibiotic | 0.10 | 0.10 | 0.10 | 0.10 | 0.10 |
| WGB | | 0.10 | 0.30 | 0.60 | 0.10 |

The basal diet comprising mainly corn and soybean meal had 3,380 kcal of ME/kg, 19.00% of CP, 1.00% of lysine, 0.80% of Ca and 0.70% of P on the basis of NRC (1998) breeding standard. The test fodder was freely fed in powdered form and water was freely supplied by means of a water supplying station. The body weights and the intake amounts of the fodder for respective animals were measured at the beginning of the test, $14^{th}$ day of the test and the end of the test to calculate the weight gain, feed intake amount and feed efficiency.

Also, the animals were supplied with the fodder to which 0.2% of chromium oxide as an indicator was added from 7 days before the end of the test for measurement of the digestive efficiency. At 4 days after feeding the chrome containing fodder, excrements were collected and dried for analysis.

Further, at the beginning of the test and at the $14^{th}$ day of the test, blood samples were taken from the jugular of pigs. The blood samples were coagulated at 4° C. and then centrifuged at 3,000 rpm for 30 minutes at the same temperature. The respective supernatants were separated and used for analysis.

The total cholesterol concentration was measured using T. chol kit (BOEHRINGER MANNHEIM, Germany) and the high density lipoprotein cholesterol concentration was measured using HDL-C kit (BOEHRINGER MANNHEIM, Germany). The concentration of adult disease preventive factor (Triglyceride) was measured using HITACHI 747, an automatic biochemistry analyzer fabricated by HITACHI, Japan, by determining triglyceride levels using T.G kit (BOEHRINGER MANNHEMIM, Germany). The concentration of immunocyte promoting factor (Immunoglobulin G) was measured using Nephelometer (BOEHRINGER MANNHEIM, Germany) by determining immunoglobulin G using IgG kit (BEHRING, Germany). The concentration of Cortisol was measured using Y-counter (COBRA 5010II, U.S.A.) by determining cortisol using Coat-A-Count Cortisol kit (Diagnostic Products Cor.).

The component elements of the fodder and Cr added as the indicator were analyzed according to AOAC(1994). The data from the foregoing measurements were examined for the significant differences between averages by conducting Duncan's multiple range analysis using the General Linear Model Procedure of SAS(1988).

As the results, the weight gain per day, feed intake amount per day and efficiency of feed are summarized in Table 12 below.

TABLE 12

| | Item | | | | | |
|---|---|---|---|---|---|---|
| | Con | WGB 0.1 | WGB 0.3 | WGB 0.6 | WGB 1.0 | Standard error |
| 0 to 14 days | | | | | | |
| Weight gain (g/day) | 425 | 432 | 459 | 437 | 454 | 25 |
| Intake amount of Feed (g/day) | 914 | 860 | 906 | 963 | 932 | 45 |
| Feed efficiency | 0.465 | 0.502 | 0.506 | 0.454 | 0.487 | 0.015 |
| 14 to 28 days | | | | | | |
| Weight gain (g/day) | 556 | 539 | 590 | 637 | 551 | 31 |
| Intake amount of feed (g day) | 1302 | 1240 | 1286 | 1532 | 1213 | 56 |
| Feed efficiency | 0.427 | 0.435 | 0.459 | 0.416 | 0.454 | 0.031 |
| 0 to 28 days | | | | | | |
| Weight gain (g/day) | 491 | 486 | 524 | 537 | 502 | 24 |

TABLE 12-continued

| | Con | WGB 0.1 | WGB 0.3 | WGB 0.6 | WGB 1.0 | Standard error |
|---|---|---|---|---|---|---|
| Intake amount of feed (g/day) | 1108 | 1050 | 1095 | 1248 | 1073 | 56 |
| Feed efficiency | 0.443 | 0.463 | 0.479 | 0.430 | 0.468 | 0.021 |

In the table, by the 14$^{th}$ day of the experiment, the WGB 0.3 treatment group, which was fed the fodder having 0.3% of the germanium biotite added, showed the highest weight gain. With respect to the intake amount of feed, the WGB 0.6 treatment group showed the highest result among other treatment groups and the control groups. With respect to the feed efficiency, the WGB 0.3 treatment group showed the highest result among other treatment groups and the control groups.

During the period from 14 to 28 days of the experiment, the WGB 0.6 treatment group showed the highest weight gain but ingested the largest amount of feed, compared to other treatment groups and the control group. With respect to the feed efficiency, the WGB 0.3 treatment group showed the highest result among other treatment groups and the control groups.

Throughout the period of the experiments, the WGB 0.3 treatment group, which was fed the fodder having 0.3 wt % of the germanium biotite added, showed a weight gain of 6.7% (491 g vs. 524 g) more than the control group. WGB 0.6 treatment group showed a weight gain of 9.4% (491 vs. 537 g) more than the control group. Therefore, it can be seen that when the fodder contains 0.3 to 0.6 wt % of germanium biotite the weight gain of starter pigs can be improved.

With regard to the fodder intake amount, the WGB 0.6 was a little higher than other treatment groups and the control group. However, there was not observed any significant differences between the results of the respective groups.

With regard to the feed efficiency, the WGB 0.3 treatment group showed the highest result, compared to other treatment groups and the control groups. Particularly, the WGB 0.3 showed improvement of 8% (0.443 vs. 0.479) as compared to the control group. Thus, it can be seen that when starter pigs were fed with feed containing 0.3 wt % of the germanium biotite, the required amount of feed is reduced, thereby causing reduction of budget for feed, which makes up a large part of the cost of production.

For the starter pigs, Digestive rates of dry material (DM) and nitrogen (N) are examined and the results are shown in Table 13 below.

TABLE 13

| | Con | WGB 0.1 | WGB 0.3 | WGB 0.6 | WGB 1.0 | Standard error |
|---|---|---|---|---|---|---|
| Digestive rate of DM | 68.34 | 69.69 | 70.12 | 67.78 | 63.97 | 2.91 |
| Digestive rate of nitrogen | 65.15 | 67.09 | 67.50 | 56.84 | 62.58 | 3.36 |

As seen from the table, the digestive rate of dry material was higher in the WGB 0.1 treatment group and the WGB 0.3 treatment group compared to the control group. However, it is noted that when the content of the germanium biotite in the feed exceeds 0.6 wt %, the digestive rate of dry material was reduced. With regard to the digestive rate of nitrogen, the WGB 0.3 treatment group showed a higher value than other WGB treatment groups and the control group. Particularly, the rate was improved by 3.6%, compared to the control group. Like in the case of dry material, it is also noted that when the content of the germanium biotite in the feed exceeds 0.6 wt %, the digestion rate of nitrogen was reduced, considering that the WGB 0.6 treatment group showed a nitrogen digestive rate of 14.6% lower than the control group.

The starter pigs fed with the experiment feed were examined for changes of total-cholesterol, triglyceride, HDL-cholesterol, LDL-cholesterol, immunocyte promoting factor (IgG), and Cortisol, and the results are shown in Table 14 below.

TABLE 14

| Item | Con | WGB 0.1 | WGB 0.3 | WGB 0.6 | WGB 5.0 | Standard error |
|---|---|---|---|---|---|---|
| Total-cholesterol (mg/dl) | | | | | | |
| 0 day | 93.00 | 86.00 | 77.00 | 100.00 | 89.50 | 7.67 |
| 14 days | 105.00 | 86.50 | 70.00 | 96.00 | 86.50 | 2.77 |
| Difference | 12.00 | 0.50 | −7.00 | −4.00 | −3.00 | 5.43 |
| HDL-cholesterol (mg/dl) | | | | | | |
| 0 day | 30.00 | 26.00 | 41.00 | 29.00 | 25.50 | 1.99 |
| 14 days | 39.50 | 40.50 | 63.00 | 44.50 | 44.00 | 2.61 |
| Difference | 9.50 | 14.50 | 22.00 | 15.50 | 18.50 | 1.99 |
| Triglyceride (mg/dl) | | | | | | |
| 0 day | 41.00 | 32.50 | 41.00 | 63.00 | 37.33 | 8.91 |
| 14 days | 55.50 | 40.50 | 54.00 | 60.33 | 55.33 | 14.53 |
| Difference | 14.50 | 8.00 | 13.00 | −2.67 | 18.00 | 14.82 |
| LDL-cholesterol (mg/dl) | | | | | | |
| 0 day | 38.20 | 32.50 | 38.60 | 41.00 | 34.80 | 1.45 |
| 14 days | 50.60 | 48.60 | 43.00 | 48.60 | 54.07 | 4.76 |
| Difference | 12.40 | 16.10 | 4.40 | 7.60 | 19.27 | 3.47 |
| Ig G (mg/dl) | | | | | | |
| 0 day | 667.30 | 615.10 | 644.80 | 395.90 | 459.20 | 104.53 |
| 14 days | 827.20 | 894.80 | 807.00 | 647.50 | 627.20 | 87.97 |
| Difference | 149.90 | 279.70 | 162.15 | 251.60 | 168.00 | 23.60 |

TABLE 14-continued

| | Con | WGB 0.1 | WGB 0.3 | WGB 0.6 | WGB 5.0 | Standard error |
|---|---|---|---|---|---|---|
| Cortisol (μg/dl) | | | | | | |
| 0 day | 4.90 | 6.20 | 9.05 | 7.60 | 3.67 | 1.33 |
| 14 days | 0.65 | 2.95 | 5.75 | 2.00 | 1.62 | 1.68 |
| Difference | 4.26 | 3.25 | 3.30 | 5.60 | 2.05 | 2.39 |

At day 14, the total-cholesterol content in the serum was observed to be increased in the control group but to be decreased in the germanium biotite treatment groups. Specifically, the WGB treatment groups showed reduced total-cholesterol levels, except that the WGB 0.1 treatment group showed slightly increased cholesterol. Particularly, as compared to the control group, the total-cholesterol of the WGB 0.3 treatment group was 158% (12.00 ml/dl vs. −7.00 ml/dl) lower.

The HDL-cholesterol content in the serum was observed to be much higher in WGB treatment groups, compared to the control group. Particularly, as compared to the control group, the value of the WGB 0.3 treatment group was increased 132% (9.50 ml/dl vs. 22.00 ml/dl).

The contents of Triglyceride in the serum was observed to be decreased in only the WGB 0.6 treatment group.

With regard to the content of LDL-cholesterol in the serum, the WGB 0.3 treatment group was observed to be decreased by 182% (12.40 ml/dl vs. 4.40 ml/dl), compared to the control group.

Thus, it is noted that when starter pigs were fed with feed having the germanium biotite added in an amount of 0.1 to 0.3 wt % according to the present invention, serum contents of the total-cholesterol and LDL-cholesterol, major substances contributing to hyperlipidemia, which is a main cause of disease of the cardiovascular system, can be reduced. This means reduction of such compounds can be achieved in pork obtained from a pig which was fed with the fodder according to the present invention. Thus, it is proved that addition of the germanium biotite in a given amount to feed produces low-cholesterol pork.

With regard to the contents of immunocyte promoting factor (IgG: Immunoglobulin G) in the serum, the WGB 0.1, WGB 0.3, WGB 0.6 and WGB 1.0 treatment groups showed increases of 86.6%, 8.2%, 67.8% and 12.1%, respectively, as compared to the control group. Therefore, it is proven that the germanium biotite can enhance the immune ability, thereby being used as a natural antibiotic substance.

With regard to the contents of cortisol, the WGB treatment groups showed less of an increase, compared to the control group, except for the WGB 0.6 treatment group. There was no significant difference among the results.

The concentration of cortisol was measured to determine a degree of stress laid on a pig under transportation and correction (Benjamins et al., (1992)). Baybutt and Holsbocr (1990) reported that increase of cortisol causes production of antibodies by B cells and function of phagocytes to be reduced. In light of the result from the experiment using starter pigs, at a germanium biotite content of up to 0.3%, the concentration of cortisol can be reduced, compared to the control group. However, there was no significant difference.

On the basis of the results from this example, it is noted that when feeding starter pigs with feed containing the germanium biotite in an amount of 0.3 wt % low-cholesterol pork can be obtained and immune ability of the pigs are enhanced by the antibiotic action of the germanium biotite, in place of antibiotic.

Considering that starter pigs are inferior in their immune ability to growing pigs or finishing pigs, it would be desirable to use a small amount of antibiotic along with germanium biotite, as shown in the formulation of this example.

INDUSTRIAL APPLICABILITY

As described above, according to the present invention, by adding germanium biotite instead of antibiotic to assorted fodder commonly used in the livestock industry, it is possible to produce domestic animals having a growth rate and immune ability as good as by adding a large amount of antibiotic to the feed. Therefore, in preparing feed, use of antibiotic harmful to animals and a human which has consumed the meat of the animals, can be avoided partially or totally, thereby enabling production of "healthful meat".

While there have been illustrated and described what are considered to be preferred specific embodiments of the present invention, it will be understood by those skilled in the art that the present invention is not limited to the specific embodiments thereof, and various changes and modifications and equivalents may be substituted for elements thereof without departing from the true scope of the present invention.

The invention claimed is:

1. A fodder composition for domestic animals comprising a basal diet including corn, soybean meal, molasses, salt, vitamin premix and mineral premix, and 0.1 to 3.0% of germanium biotite including 36 ppm of germanium, and biotite, muscovite, feldspar, tourmaline, zircon, garnet, apatite and opaque minerals, having 0.93% of emissivity and $4.31 \times 10^2$ W/m² μm of radioactive energy at a range of far infrared rays between 5 and 20 μm.

2. The composition according to claim 1, wherein the basal diet is for growing pigs and includes 66.23 wt % corn, 26.07 wt % soybean meal, 3% tallow, 0.52 wt % limestone, 1.16 wt % calcium phosphate, 2.5 wt % molasses, 0.25 wt % salt, 0.12 wt % vitamin premix, 0.10 wt % mineral premix and 0.05 wt % antioxidant and the germanium biotite is added in an amount of 0.3 to 0.6 wt %.

3. The composition according to claim 1, wherein the basal diet is for finishing pigs and includes 76.74 wt % corn, 15.82 wt % soybean meal, 3% tallow, 2.5 wt % molasses, 0.83 wt % tricalcium phosphate, 0.61 wt % limestone, 0.20 wt % salt, 0.12 wt % vitamin premix, 0.10 wt % mineral premix, 0.05 wt % antioxidant and 0.03 wt % lysine, and the germanium biotite is added in an amount of 1.0 to 3.0 wt %.

4. The composition according to claim 1, wherein the basal diet is for starter pigs and includes 64.36 wt % corn, 28.09 wt % soybean meal, 3 wt % tallow, 0.12 wt % limestone, 1.86 wt % calcium phosphate, 2 wt % molasses, 0.20 wt % salt, 0.12 wt % vitamin premix, 0.10 wt % mineral premix, 0.05 wt % antioxidant and 0.10 wt % antibiotics and the germanium biotite is added in an amount of 0.3 wt %.

5. The composition according to claim 1, wherein the germanium biotite is pulverized to have a particle size of 100 to 350 mesh.

6. The composition according to claim 2, wherein the germanium biotite is pulverized to have a particle size of 100 to 350 mesh.

7. The composition according to claim 3, wherein the germanium biotite is pulverized to have a particle size of 100 to 350 mesh.

8. The composition according to claim 4, wherein the germanium biotite is pulverized to have a particle size of 100 to 350 mesh.

* * * * *